(12) United States Patent
Tanigaki et al.

(10) Patent No.: US 10,276,315 B2
(45) Date of Patent: Apr. 30, 2019

(54) OPERATING DEVICE FOR POWER SWITCHGEAR

(71) Applicant: MITSUBISHI ELECTRIC CORPORATION, Chiyoda-ku, Tokyo (JP)

(72) Inventors: Shuichi Tanigaki, Tokyo (JP); Tomohito Mori, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/735,003

(22) PCT Filed: Jun. 12, 2015

(86) PCT No.: PCT/JP2015/067079
§ 371 (c)(1),
(2) Date: Dec. 8, 2017

(87) PCT Pub. No.: WO2016/199303
PCT Pub. Date: Dec. 15, 2016

(65) Prior Publication Data
US 2018/0166226 A1  Jun. 14, 2018

(51) Int. Cl.
*H01H 3/04* (2006.01)
*H01H 33/42* (2006.01)
(Continued)

(52) U.S. Cl.
CPC ............... *H01H 3/04* (2013.01); *H01H 3/32* (2013.01); *H01H 3/42* (2013.01); *H01H 33/42* (2013.01);
(Continued)

(58) Field of Classification Search
CPC ......... H01H 3/3021; H01H 2003/3063; H01H 2043/107; H01H 3/30; H01H 3/42;
(Continued)

(56) References Cited

U.S. PATENT DOCUMENTS 8,330,065 B2 * 12/2012 Ohda .................. H01H 3/3031
200/318
2002/0056631 A1 * 5/2002 Ohtsuka ............... H01H 3/3042
200/400
(Continued)

FOREIGN PATENT DOCUMENTS

JP   4-008237 U   1/1992
JP   5-28882 A    2/1993

OTHER PUBLICATIONS

International Search Report (PCT/ISA/210) dated Sep. 1, 2015, by the Japanese Patent Office as the International Searching Authority for International Application No. PCT/JP2015/067079.
(Continued)

*Primary Examiner* — Ahmed M Saeed
(74) *Attorney, Agent, or Firm* — Buchanan Ingersoll & Rooney PC

(57) ABSTRACT

An operating device for a power switchgear includes: an output lever coupled to a movable-contact of the switchgear; a torsion bar releasing an accumulated force when the switchgear is opened to rotate the lever in the counterclockwise direction and drive the movable-contact in an opening direction; an opening latch engaged with the lever to hold an accumulated force of the torsion bar; a cam rotating when the switchgear is closed, having contact with the lever to rotate the lever in the clockwise direction, and driving the movable-contact in a closing direction; another torsion bar releasing the accumulated force when the switchgear is closed to rotate the cam; and a closing latch which can be engaged with the cam to hold the accumulated force of the
(Continued)

torsion bar. The cam includes opposed cam elements, a pin whose ends are rotatably supported by the elements, and a bolt fastening the elements.

3 Claims, 7 Drawing Sheets

(51) Int. Cl.
*H01H 3/32* (2006.01)
*H01H 3/42* (2006.01)
*H02B 13/00* (2006.01)

(52) U.S. Cl.
CPC ......... *H01H 2235/01* (2013.01); *H02B 13/00* (2013.01)

(58) Field of Classification Search
CPC ...... H01H 3/3031; H01H 3/46; H01H 3/3005; H01H 3/3042; H01H 23/168; Y10T 74/19874; Y10T 74/19642; Y10T 74/19647

USPC .............. 200/400, 17 R, 318, 401, 325, 501; 74/412 R, 413, 435, 551.8, 10.8
See application file for complete search history.

(56) References Cited

U.S. PATENT DOCUMENTS

2003/0034242 A1* 2/2003 Mori .................... H01H 3/3015
200/400
2010/0164659 A1* 7/2010 Ohtsuka .................. H01H 3/30
335/174

OTHER PUBLICATIONS

Written Opinion (PCT/ISA/237) dated Sep. 1, 2015, by the Japanese Patent Office as the International Searching Authority for International Application No. PCT/JP2015/067079.

* cited by examiner

A-A

B-B

C-C

D-D

OPERATING DEVICE FOR POWER SWITCHGEAR

FIELD

The present invention relates to an operating device for a power switchgear.

BACKGROUND

An operating device for a power switchgear described in Patent Literature 1 energizes a torsion bar and releases an accumulated energy of the torsion bar to open and close a contact of the power switchgear. Two types of torsion bars that are an opening torsion bar and a closing torsion bar are provided. An energy of the closing torsion bar is obtained by rotating a closing main shaft to which one end of the closing torsion bar is fixed and twisting the closing torsion bar.

A closing lever is fixed to the closing main shaft, and a large gear is coupled to the closing lever via a link. In addition, the large gear is fixed to a camshaft to which a cam is fixed. Therefore, although the energized closing torsion bar attempts to rotate the cam via the closing main shaft, the closing lever, the link, the large gear, and the camshaft, the cam is held by a closing latch mechanism until a closing operation is started.

That is, a pin is rotatably provided in the cam, and the rotation of the cam is regulated by the pin engaging with the closing latch, and so a state where an energy is stored in the closing torsion bar is maintained. In the closing operation, the operating device releases the engagement between the pin provided in the cam and the closing latch, releases the energy of the closing torsion bar, and drives a movable contact of the power switchgear in a closing direction.

CITATION LIST

Patent Literature

Patent Literature 1: Japanese Patent Application Laid-open No. 5-28882

SUMMARY

Technical Problem

However, in the conventional operating device for the power switchgear, since the pin is supported by the cam in a so-called cantilever structure in which only one end of the pin is inserted into the cam, a bending moment acts on the pin due to a reaction force from the closing latch in a state where the pin is engaged with the closing latch. In a case where the bending moment acts on the pin, the pin is inclined, and a thrust load is generated on the pin. Then, a sliding friction at a contact part between one end of the pin and the cam increases and may sometimes hamper release of the engagement between the closing latch and the pin at the time of the closing operation. Therefore, reliability of the closing operation is deteriorated.

The present invention has been made in view of the above circumstances, and its object is to provide an operating device for a power switchgear capable of improving reliability of a closing operation.

Solution to Problem

In order to solve the above-mentioned problems and achieve the object, the present invention provides an operating device for a power switchgear comprising: an output lever fixed to a main shaft and coupled to a movable contact of the power switchgear; an opening spring to release an accumulated force when the power switchgear is opened and rotate the output lever in a first direction to drive the movable contact in an opening direction; an opening latch capable of being engaged with the output lever to hold an accumulated force of the opening spring; a cam fixed to a camshaft, to rotate when the power switchgear is closed to have contact with the output lever, to rotate the output lever in a second direction reverse to the first direction, and to drive the movable contact in a closing direction; a closing spring to release an accumulated force when the power switchgear is closed and rotate the cam; and a closing latch capable of being engaged with the cam to hold an accumulated force of the closing spring, wherein the cam includes: a first plate-like part that is a cam element fixed to the camshaft and capable of having contact with the output lever; a second plate-like part disposed in parallel to the first plate-like part and disposed apart from the first plate-like part in a direction toward the camshaft with an interval between the second plate-like part and the first plate-like part, in which the closing latch is insertable; a pin to penetrate the first and second plate-like parts in a direction of the camshaft, which has both ends rotatably supported by the first and second plate-like parts, and can be engaged with the closing latch; and a coupling unit to couple the first plate-like part with the second plate-like part.

Advantageous Effects of Invention

According to the present invention, reliability of a closing operation can be improved.

DESCRIPTION OF EMBODIMENTS

Hereinafter, embodiments of an operating device for a power switchgear according to the present invention will be described in detail with reference to the drawings. The present invention is not necessarily limited by the embodiments.

First Embodiment

Figure 1:
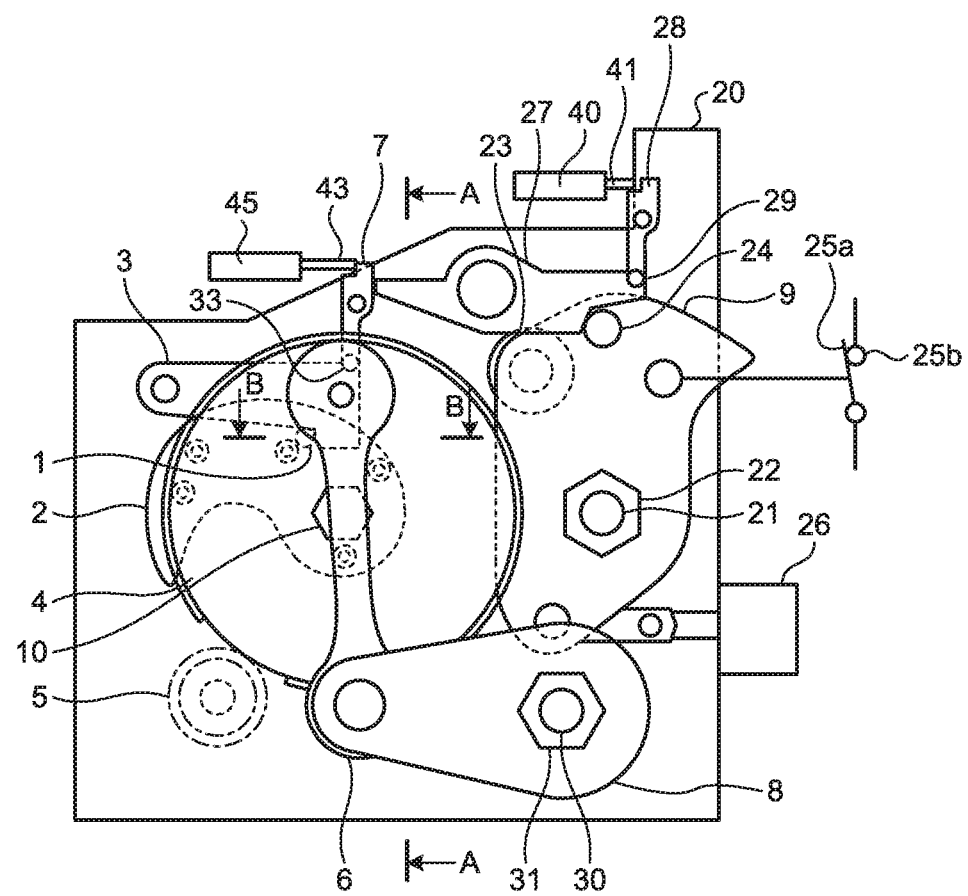
FIG. 1 is a front view illustrating a structure of an operating device for a power switchgear according to a first embodiment.

FIG. 1 is a front view illustrating a structure of an operating device of a power switchgear according to the present embodiment. In FIG. 1, the structure of the operating device in a case where the power switchgear is closed is illustrated. The power switchgear is an on/off switching device that is provided in a power system, and cuts off a fault current or a load current or activates a system voltage. The power switchgear is, for example, a gas circuit breaker.

An output lever 9 is fixed to a main shaft 22. The main shaft 22 is rotatably supported by a housing 20. One end of a torsion bar 21 is fixed to the main shaft 22. The torsion bar 21 is one type of an opening spring. The torsion bar 21 applies a rotational force to the main shaft 22 in a counterclockwise direction which is a first direction. The output lever 9 is coupled to a movable contact 25a of the power switchgear via a link mechanism which is not illustrated. The movable contact 25a has contact with or separates from a fixed contact 25b. The output lever 9 is coupled to a damper 26. The damper 26 mitigates shock caused at the time of opening and closing. A pin 24 which is an opening latch pin is provided in the output lever 9. Furthermore, the output lever 9 has a roller 23, and the roller 23 is rotatably supported by the output lever 9 to make axial support.

An opening latch 27 is rotatably supported by the housing 20 to make axial support. The opening latch 27 is engaged with the pin 24. An accumulated force of the torsion bar 21 attempts to rotate the output lever 9 in a counterclockwise direction, whereas the opening latch 27 is engaged with the pin 24 to hamper the rotation of the output lever 9 in the counterclockwise direction. A pin 29 is provided in the opening latch 27.

An opening trigger 28 is rotatably supported by the housing 20 to make axial support. The opening trigger 28 is engaged with the pin 29 of the opening latch 27 to hamper the rotation of the opening latch 27 in the counterclockwise direction. An opening electromagnet 40 includes a reciprocatable plunger 41. When an opening signal is inputted, the opening electromagnet 40 drives the plunger 41 in the right direction in FIG. 1 to press the opening trigger 28, and then rotates the opening trigger 28 in a clockwise direction which is a second direction reverse to the first direction so as to release the engagement between the opening trigger 28 and the pin 29.

On the other hand, a closing lever 8 is fixed to a closing main shaft 31. The closing main shaft 31 is rotatably supported by the housing 20. One end of a torsion bar 30 is fixed to the closing main shaft 31. The torsion bar 30 is one type of a closing spring. The torsion bar 30 applies a rotational force to the closing main shaft 31 in a clockwise direction.

One end of a link 6 is rotatably coupled to one end of the closing lever 8. The other end of the link 6 is rotatably coupled to a large gear 4. That is, the closing lever 8 is coupled to the large gear 4 via the link 6. The large gear 4 is fixed to a camshaft 10, and a cam 2 is fixed to the camshaft 10. The camshaft 10 is rotatably supported by the housing 20 to make axial support. The cam 2 turns integrally with the large gear 4 via the camshaft 10. A small gear 5 meshed with the large gear 4 is rotatably supported by the housing 20. When the torsion bar 30 is energized, the large gear 4 lacks some teeth so as to be disengaged from the small gear 5. To energize the torsion bar 30, the small gear 5 can be driven in the counterclockwise direction by a motor which is not illustrated. A pin 1 which is a closing latch pin is provided in the cam 2.

A closing latch 3 is rotatably supported on the housing 20 to make axial support. The closing latch 3 is engaged with the pin 1. The accumulated force of the torsion bar 30 attempts to rotate the cam 2 in the clockwise direction, whereas the closing latch 3 is engaged with the pin 1 to hamper the rotation of the cam 2 in the clockwise direction. A pin 33 is provided in the closing latch 3.

When the power switchgear is closed, the cam 2 turns in the clockwise direction by releasing the engagement between the closing latch 3 and the pin 1, and then has butt-contact with the roller 23 and turns the output lever 9 in the clockwise direction to drive the movable contact 25a in the closing direction. The closing direction is a direction toward the fixed contact 25b. At this time, the cam 2 energizes the torsion bar 21 by turning the output lever 9 in the clockwise direction.

A closing trigger 7 is rotatably supported on the housing 20 to make axial support. The closing trigger 7 is engaged with the pin 33 of the closing latch 3 to hamper the rotation of the closing latch 3 in the counterclockwise direction.

A closing electromagnet 45 includes a reciprocatable plunger 43. When a closing signal is inputted, the closing electromagnet 45 drives the plunger 43 in the right direction in FIG. 1 to press the closing trigger 7, and then rotates the closing trigger 7 in the clockwise direction to release the engagement between the closing trigger 7 and the pin 33.

Figure 2:
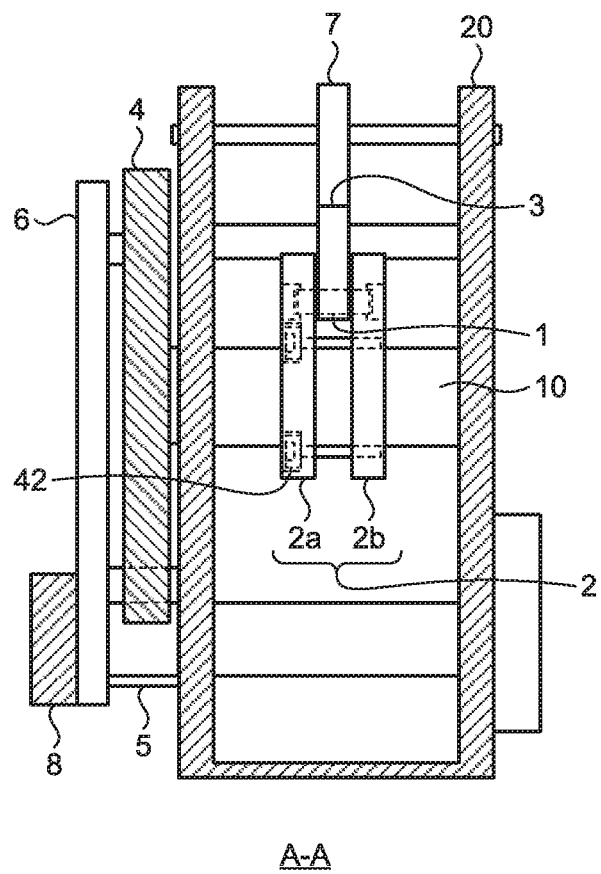
FIG. 2 is a cross-sectional view taken along arrows A-A in FIG. 1.
Figure 3:
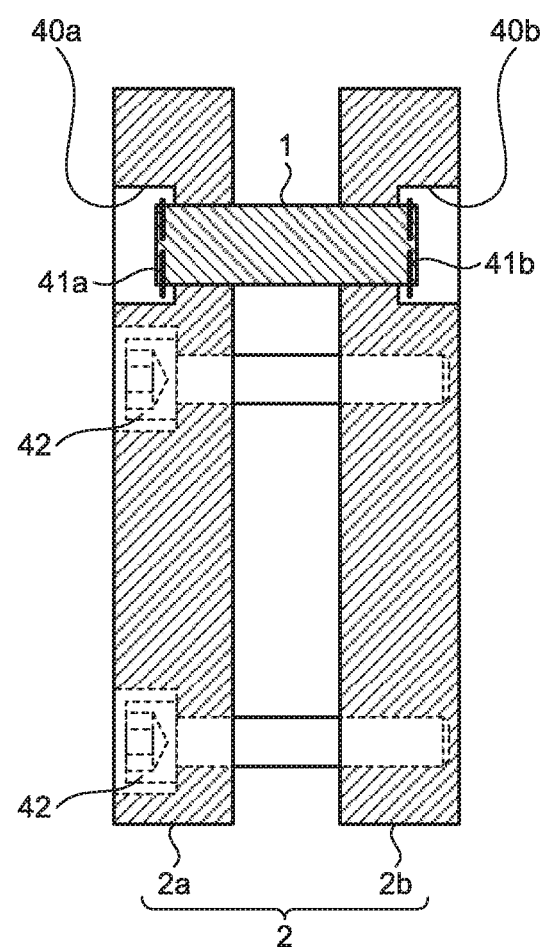
FIG. 3 is a cross-sectional view taken along arrows B-B in FIG. 1

Next, a detailed structure of the cam 2 will be described with reference to FIGS. 2 and 3. FIG. 2 is a cross-sectional view taken along arrows A-A in FIG. 1, and FIG. 3 is a cross sectional view taken along arrows B-B in FIG. 1.

The cam 2 includes a pair of cam elements 2a and 2b opposed to each other, the pin 1 of which both ends are rotatably supported by the respective cam elements 2a and 2b, and a bolt 42 for fastening the cam elements 2a and 2b to each other.

The cam elements 2a and 2b have plate-like shapes. The cam elements 2a and 2b are fixed to the camshaft 10. The cam elements 2a and 2b are provided in parallel to each other and are disposed to be perpendicular to the direction of the camshaft 10. Furthermore, the cam elements 2a and 2b are disposed apart from each other in the direction of the camshaft 10. In an interval between the cam elements 2a and 2b, the closing latch 3 can be inserted. The cam elements 2a and 2b are equal to each other in shape and in size. The cam element 2a is a first plate-like part, and the cam element 2b is a second plate-like part. The cam element 2a is separated from the cam element 2b.

A counterbore hole 40a is provided in the cam element 2a, and one end of the pin 1 penetrates the cam element 2a to be projected to the counterbore hole 40a. Similarly, a counterbore hole 40b is provided in the cam element 2b, and the other end of the pin 1 penetrates the cam element 2b to be projected to the counterbore hole 40b. In addition, a groove is formed in one end of the pin 1, and a C-shaped snap ring 41a is fitted in the groove. Similarly, another groove is formed in the other end of the pin 1, and another C-shaped snap ring 41b is fitted in the groove. The snap rings 41a and 41b prevent the pin 1 from moving in the axial direction and falling off from the cam elements 2a and 2b.

The bolt 42 is, for example, a socket bolt. In the example shown in FIG. 3, a plurality of bolts 42 is provided. The bolt 42 disperses a stress acting on the cam 2 and keeps an interval between the cam elements 2a and 2b constant. The bolt 42 is a coupling unit coupling the cam elements 2a and 2b.

In this way, in the present embodiment, the cam 2 has two plate-like cam elements 2a and 2b, and both ends of the pin 1 are rotatably supported by the cam elements 2a and 2b. That is, the pin 1 is supported by the cam elements 2a and 2b in a structure of both ends thereof being supported. A part of the closing latch 3 is inserted between the cam elements 2a and 2b and the closing latch 3 and the pin 1 are engaged with each other so that the rotation of the cam 2 is regulated and the accumulated force of the torsion bar 30 is maintained.

As illustrated in FIG. 2, since the cam 2 is disposed at a center of the housing 20 in the direction of the camshaft 10, the closing latch 3 and the closing trigger 7 are disposed at the center of the housing 20 in the direction of the camshaft 10. Therefore, in comparison with the traditional one, an arrangement configuration well-balanced in the direction of the camshaft 10 can be obtained.

Both of the cam elements 2a and 2b are brought into butt-contact with the roller 23 to rotate the output lever 9. Noted that the "cam element" is a part of the cam 2 which has butt-contact with the roller 23 rotatably attached to the output lever 9.

Next, the operation of the present operating device will be described. The operation of the present operating device is similar to the operation of the operating device described in Patent Literature 1 except for a point relating to the structure of the cam 2 described above. Therefore, only an outline will be described below.

First, the outline of an opening operation is as follows. In the closed state illustrated in FIG. 1, the torsion bar 21 applies a rotational force in the counterclockwise direction to the output lever 9, whereas the rotation in the counterclockwise direction is regulated by the opening latch 27 and the opening trigger 28. In this state, when an opening signal is inputted to the opening electromagnet 40 and the opening electromagnet 40 is excited, the plunger 41 moves rightward in FIG. 1, and the opening trigger 28 pushed by the plunger 41 rotates in the clockwise direction, so that the engagement between the opening trigger 28 and the pin 29 is released. Therefore, the opening latch 27 rotates in the counterclockwise direction by a reaction force from the pin 24, the engagement between the opening latch 27 and the pin 24 is released, and then the output lever 9 rotates in the counterclockwise direction. As a result, the movable contact 25a is driven in the opening direction to open the path. The opening direction is a direction in which the movable contact 25a gets away from the fixed contact 25b.

Subsequently, the outline of a closing operation is as follows. In the opened state described above, the torsion bar 30 applies a rotational force in the clockwise direction to the cam 2 via the camshaft 10, the large gear 4, the link 6, the closing lever 8, and the closing main shaft 31, whereas the rotation in the clockwise direction is regulated by the closing latch 3 and the closing trigger 7. In particular, the closing latch 3 is engaged with the pin 1. In this state, when a closing signal is inputted to the closing electromagnet 45 and the closing electromagnet 45 is excited, the plunger 43 moves rightward in FIG. 1, and the closing trigger 7 pushed by the plunger 43 rotates in the clockwise direction, so that the engagement between the closing trigger 7 and the pin 33 is released. Therefore, the closing latch 3 rotates in the counterclockwise direction by a reaction force from the pin 1, the engagement between the closing latch 3 and the pin 1 is released, and then the cam 2 rotates in the clockwise direction. At this time, since the pin 1 is supported on the cam elements 2a and 2b in a structure of both ends thereof being supported, the pin 1 is inhibited from inclining and a thrust load is inhibited from being generated, as compared with the cantilever structure. Accordingly, a sliding friction at the contact part between the pin 1 and the cam 2 is minimized, and the engagement between the closing latch 3 and the pin 1 is easily released. The rotation of the cam 2 makes the cam elements 2a and 2b have butt-contact with the roller 23, and the cam 2 pushes up the roller 23.

Therefore, the output lever 9 turns in the clockwise direction while twisting the torsion bar 21. With this movement, the movable contact 25a is driven in the closing direction to close the path.

Immediately after closing the path, the torsion bar 30 is in a state of energy being discharged. However, by rotating the small gear 5 in the counterclockwise direction using the above-mentioned motor, the large gear 4 rotates in the clockwise direction, and the torsion bar 30 is energized via the link 6, the closing lever 8, and the closing main shaft 31, while the closing latch 3 and the pin 1 are engaged with each other and the closed state illustrated in FIG. 1 is restored.

As described above, the present embodiment has: the output lever 9 fixed to the main shaft 22 and coupled to the movable contact 25a of the power switchgear; the torsion bar 21 which releases the accumulated force when the power switchgear is opened to rotate the output lever 9 in the counterclockwise direction and drive the movable contact 25a in the opening direction; the opening latch 27 which can be engaged with the output lever 9 to hold the accumulated force of the torsion bar 21; the cam 2 which is fixed to the camshaft 10 and rotates when the power switchgear is closed to have contact with the roller 23 rotatably attached to the output lever 9, rotate the output lever 9 in the clockwise direction, and drive the movable contact 25a in the closing direction; the torsion bar 30 which releases the accumulated force when the power switchgear is closed to rotate the cam 2; and the closing latch 3 which can be engaged with the cam 2 to hold the accumulated force of the torsion bar 30. The cam 2 includes the pair of cam elements 2a and 2b opposed to each other, the pin 1 of which both ends are rotatably supported by the cam elements 2a and 2b, and the bolt 42 which fastens the cam elements 2a and 2b to each other.

According to the present embodiment, since the pin 1 is supported by the cam 2 in a structure of both ends thereof being supported, the inclination of the pin 1 is suppressed in a state where the pin 1 is engaged with the closing latch 3, and the generation of the thrust load is suppressed. Therefore, the sliding friction at the contact parts between both ends of the pin 1 inserted in the cam 2 and the cam 2 is suppressed, and the engagement between the closing latch 3 and the pin 1 is easily released. Therefore, stable release of engagement is realized, and reliability of the closing operation is improved.

In the present embodiment, the torsion bar 21 is used as an opening spring, and the torsion bar 30 is used as a closing spring. However, the present invention is not limited to this, and, for example, a coil spring may be used therefor.

In the present embodiment, the counterbore holes 40a and 40b are respectively provided in the cam elements 2a and 2b. However, the pin 1 may pass through the cam elements 2a and 2b without providing the counterbore holes 40a and 40b.

While the pin 1 is rotatably supported by the cam 2, the pin 1 rotates more smoothly by providing bearings which are not illustrated between one end of the pin 1 and the cam element 2a and between the other end of the pin 1 and the cam element 2b, respectively.

Second Embodiment

Figure 4:
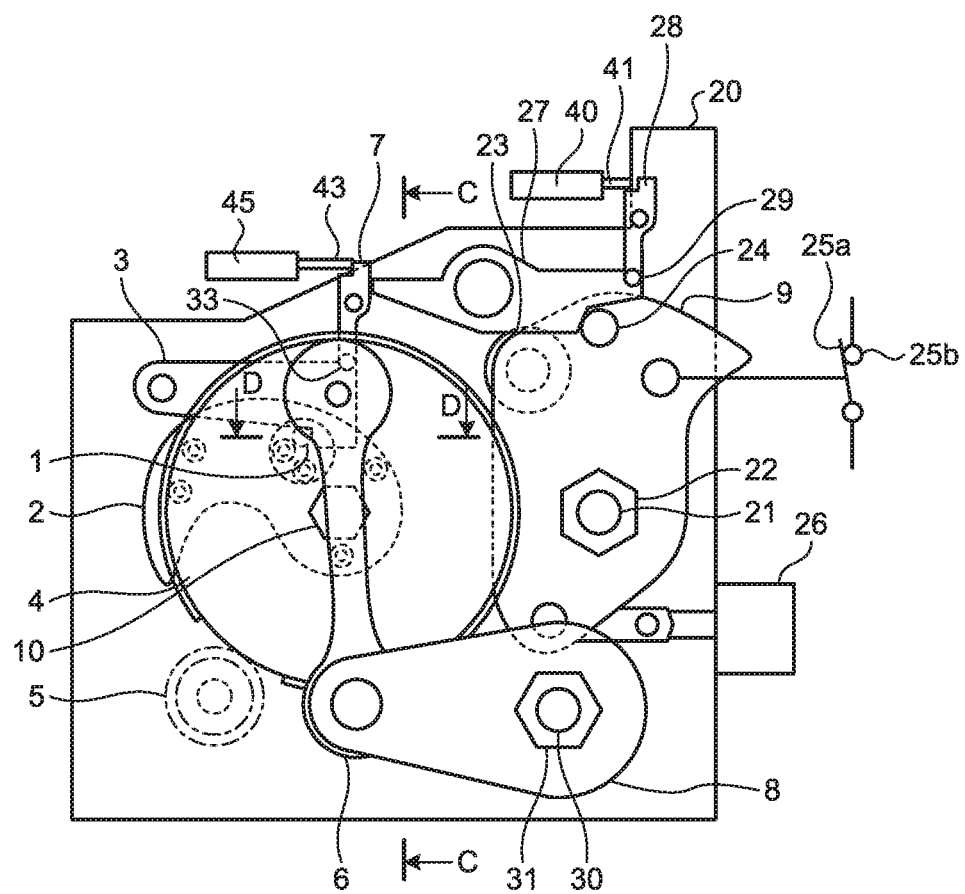
FIG. 4 is a front view illustrating a structure of an operating device for a power switchgear according to a second embodiment.
Figure 5:
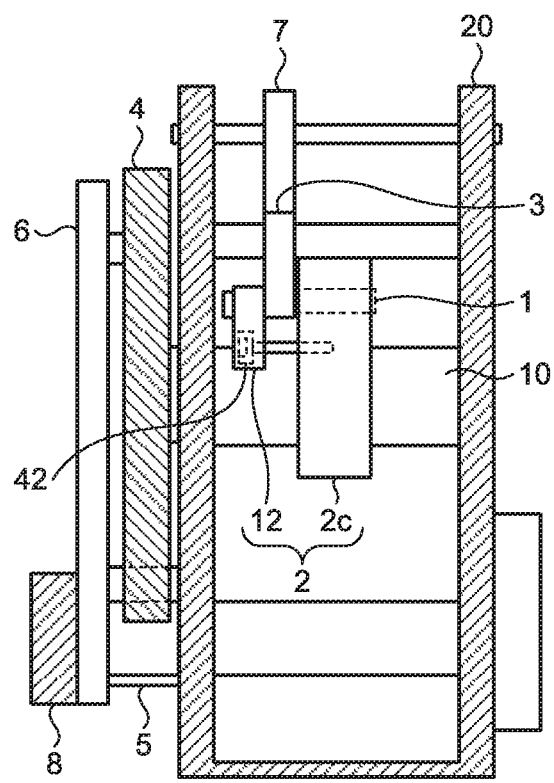
FIG. 5 is a cross-sectional view taken along arrows C-C in FIG. 4.
Figure 6:
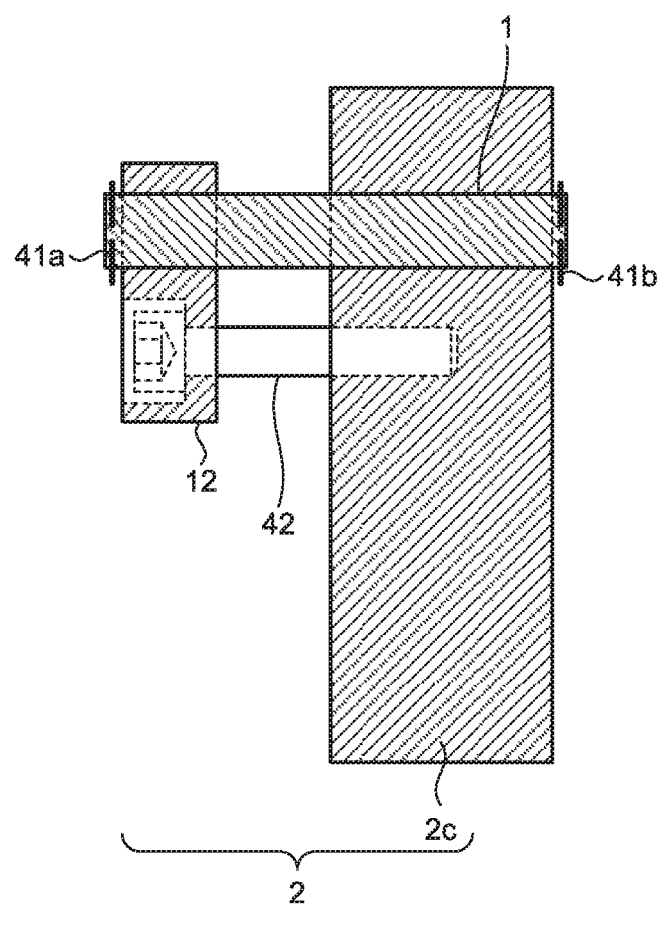
FIG. 6 is a cross-sectional view taken along arrows D-D in FIG. 4.

FIG. 4 is a front view illustrating a structure of an operating device of a power switchgear according to the present embodiment. FIG. 5 is a cross-sectional view taken along arrows C-C in FIG. 4. FIG. 6 is a cross-sectional view taken along arrows D-D in FIG. 4. In FIGS. 4 and 5, the components identical with those illustrated in FIGS. 1 and 2 are denoted by the same reference symbols.

As illustrated in FIGS. 4 to 6, in the second embodiment, the structure of the cam 2 is different from that in the first embodiment. Specifically, description therefor is as follows.

The cam 2 includes a cam element 2C, a plate-like part 12 disposed in parallel to the cam element 2C and disposed apart from the cam element 2C in a direction toward a camshaft 10 with an interval between the part 12 and the cam element 2C in which a closing latch 3 can be inserted, a pin 1 of which both ends are rotatably supported by the cam element 2C and the plate-like part 12, and a bolt 42 that fastens the cam element 2C and the plate-like part 12.

The cam element 2C has a plate-like shape. The plate-like part 12 is smaller than the cam element 2C in planar view and disposed to be housed in a region of the cam element 2C. For example, the plate-like part 12 has a circular shape in planar view. The herein-said planar view is a planar view when viewing from the direction of the camshaft 10. The plate-like part 12 is separated from the cam element 2C. Although the cam element 2C is fixed to the camshaft 10, the plate-like part 12 is not fixed to the camshaft 10. The cam element 2C and the plate-like part 12 are in parallel to each other and disposed to be perpendicular to the direction of the camshaft 10. Furthermore, the cam element 2C and the plate-like part 12 are disposed apart from each other in the direction of the camshaft 10. In an interval between the cam element 2C and the plate-like part 12, the closing latch 3 can be inserted. The cam element 2C is a first plate-like part, and the plate-like part 12 is a second plate-like part.

One end of the pin 1 penetrates the plate-like part 12, and the other end of the pin 1 penetrates the cam element 2C. In addition, a groove is formed in the one end of the pin 1, and a C-shaped snap ring 41a is fitted in the groove. Similarly, a groove is formed in the other end of the pin 1, and a C-shaped snap ring 41b is fitted in the groove. The snap rings 41a and 41b prevent the pin 1 from moving in the axial direction and falling off from the cam element 2C and the plate-like part 12.

The bolt 42 is, for example, a socket bolt. The bolt 42 passes through the plate-like part 12 and is screwed into a female screw provided in the cam element 2C. In the example shown in the figure, the plurality of bolts 42 is provided. The bolt 42 keeps the interval between the cam element 2C and the plate-like part 12 constant. The bolt 42 is a coupling unit that couples the cam element 2C and the plate-like part 12.

As described above, the cam 2 has a structure in which the female screw is provided in the cam element 2C similar to the conventional one, the plate-like part 12 is fastened to the cam element 2C with the bolt 42, and both ends of the pin 1 are supported by the cam element 2C and the plate-like part 12.

As illustrated in FIG. 5, although the cam 2 is disposed at the center of the housing 20 in the direction of the camshaft 10, the closing latch 3 is not sandwiched by the cam 2 as in the first embodiment. Therefore, the arrangement of the closing latch 3 and the closing trigger 7 in the direction of the camshaft 10 can be the same as that in the prior art, and a change in design is not required.

In the present embodiment, the pin 1 has a structure of its each end being supported by combining the plate-like part 12 with the cam element 2C. Therefore, while the structure is simple with small design change from that in the prior art, an advantageous effect similar to that of the first embodiment can be obtained. That is, the engagement between the closing latch 3 and the pin 1 is easily released, the stable release of engagement is realized, and the reliability of the closing operation is improved.

Since the plate-like part 12 is smaller than the cam element 2C in planar view and disposed to be fit in the region of the cam element 2C, only the cam element 2C of the cam 2 can have butt-contact with the roller 23 and can rotate the output lever 9.

Figure 7:
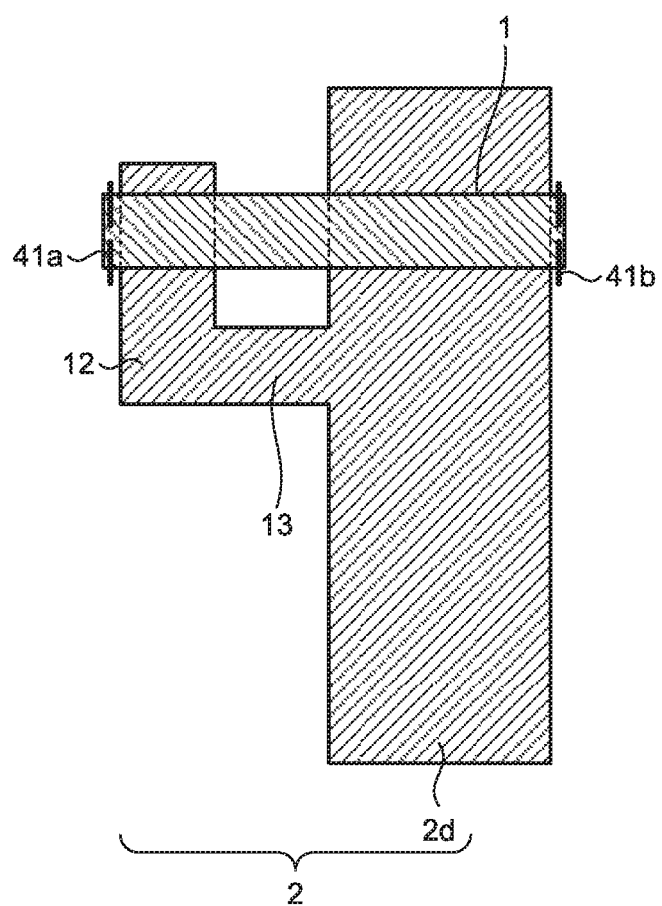
FIG. 7 is a cross-sectional view illustrating a structure of a cam according to a modification of the second embodiment.

FIG. 7 is a cross-sectional view illustrating a structure of the cam 2 according to a modification of the present embodiment, and FIG. 7 is comparable to FIG. 6. As illustrated in FIG. 7, the cam 2 is configured with the cam element 2d and the plate-like part 12 being formed integrally with a columnar coupling unit 13. Therefore, it is not necessary to couple the cam element 2d and the plate-like part 12 with the bolt 42.

According to the present modification, since the cam element 2d, the plate-like part 12, and the coupling unit 13 are integrally formed, an advantageous effect is obtained that the number of components can be reduced. Other effects of the present modification are the same as those of the cam 2 illustrated in FIG. 6.

Other structures, operations, and effects according to the present embodiment are the same as those of the first embodiment.

The structures illustrated in the above embodiments illustrate exemplary contents of the present invention and can be combined with other publicly known techniques and partially omitted and/or modified without departing from the scope of the present invention.

REFERENCE SIGNS LIST 1, 24, 29, 33 pin; 2 cam; 2a, 2b, 2C, 2d cam element; 3 closing latch; 4 large gear; 5 small gear; 6 link; 7 closing trigger; 8 closing lever; 9 output lever; 10 camshaft; 12 plate-like part; 13 coupling unit; 20 housing; 21, 30 torsion bar; 22 main shaft; 23 roller; 25a movable contact; 25b fixed contact; 26 damper; 27 opening latch; 28 opening trigger; 31 closing main shaft; 40 opening electromagnet; 40a, 40b counterbore hole; 41, 43 plunger; 41a, 41b snap ring; 42 bolt; 45 closing electromagnet.

The invention claimed is:
1. An operating device for a power switchgear comprising:
an output lever fixed to a main shaft and coupled to a movable contact of the power switchgear;
an opening spring to release an accumulated force when the power switchgear is opened and rotate the output lever in a first direction to drive the movable contact in an opening direction;
an opening latch capable of being engaged with the output lever to hold an accumulated force of the opening spring;
a cam fixed to a camshaft, to rotate when the power switchgear is closed to have contact with the output lever, to rotate the output lever in a second direction reverse to the first direction, and to drive the movable contact in a closing direction;
a closing spring to release an accumulated force when the power switchgear is closed and rotate the cam; and
a closing latch capable of being engaged with the cam to hold an accumulated force of the closing spring,
wherein the cam includes:
a first plate-like part that is a cam element fixed to the camshaft and capable of having contact with the output lever;

a second plate-like part disposed in parallel to the first plate-like part and disposed apart from the first plate-like part in a direction toward the camshaft with an interval between the second plate-like part and the first plate-like part, in which the closing latch is insertable, the second plate-like part being smaller than the first plate-like part in planar view and disposed to be fit in a region of the first plate-like part, and being non-contact with the output lever;

a pin to penetrate the first and second plate-like parts in a direction of the camshaft, which has both ends rotatably supported by the first and second plate-like parts, and can be engaged with the closing latch; and a coupling unit to couple the first plate-like part with the second plate-like part.

2. The operating device for a power switchgear according to claim 1, wherein the coupling unit is a bolt.

3. The operating device for a power switchgear according to claim 1, wherein the first plate-like part, the second plate-like part, and the coupling unit are integrally formed.

* * * * *